Jan. 5, 1960     F. N. ZIMMERMANN ET AL     2,919,726
LIQUID WHIPPING AND DISPENSING MACHINE
Filed July 3, 1958                          2 Sheets-Sheet 1
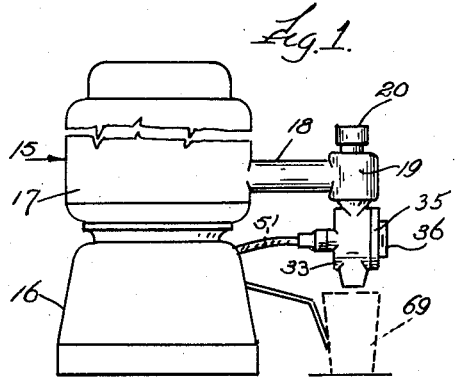
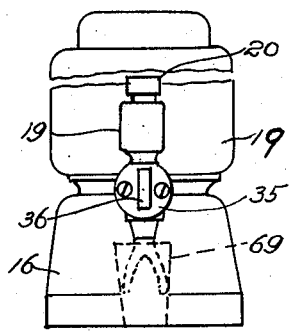
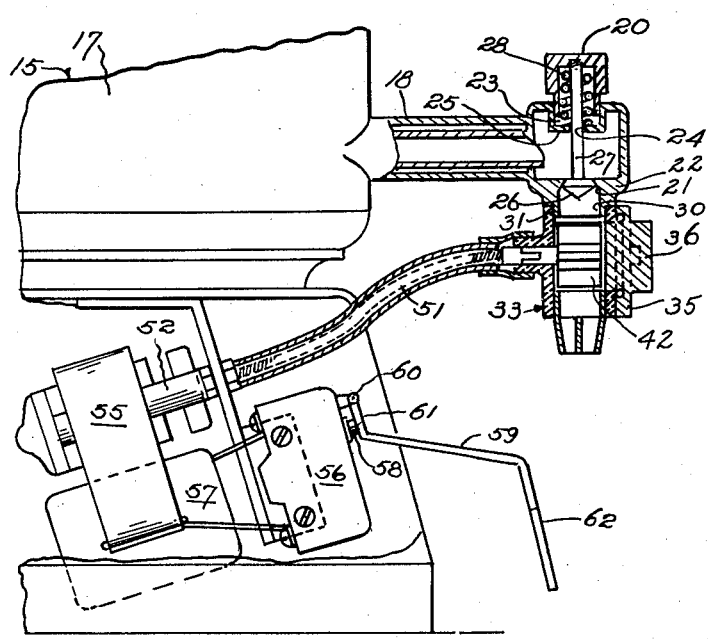
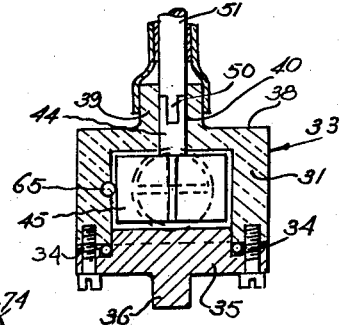
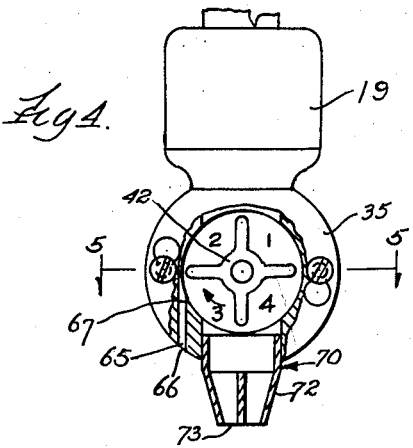
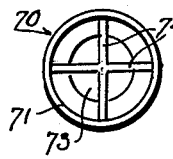

Jan. 5, 1960   F. N. ZIMMERMANN ET AL   2,919,726
LIQUID WHIPPING AND DISPENSING MACHINE
Filed July 3, 1958   2 Sheets-Sheet 2
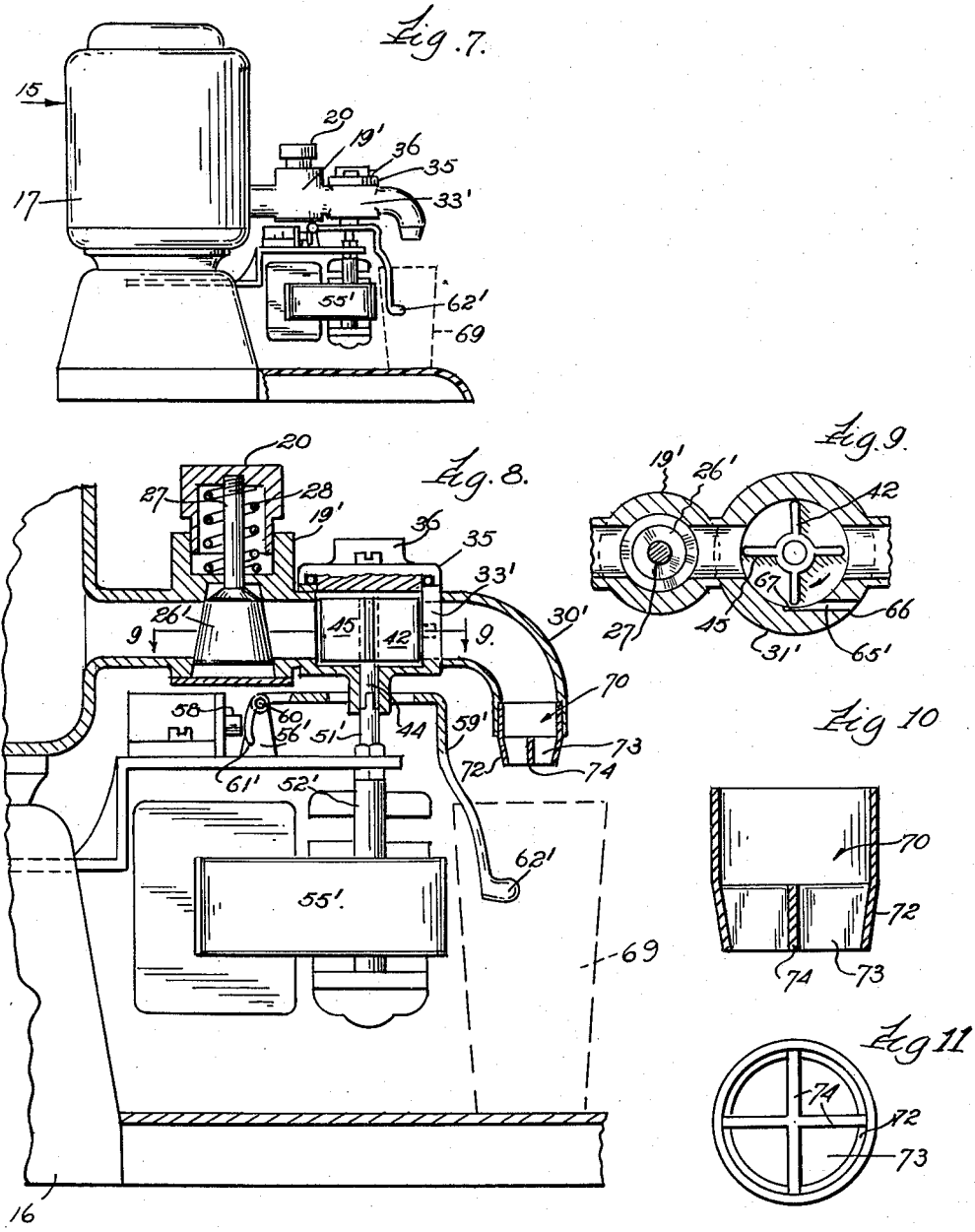
INVENTORS.
Frederick N. Zimmermann,
Willy E. Zimmermann.
BY
Joseph B. Lindecker.
Attorney.

United States Patent Office 2,919,726
Patented Jan. 5, 1960

2,919,726

LIQUID WHIPPING AND DISPENSING MACHINE

Frederick N. Zimmermann and Willy E. Zimmermann, Chicago, Ill., assignors to March Manufacturing Co., Skokie, Ill., a corporation of Illinois Application July 3, 1958, Serial No. 746,356

13 Claims. (Cl. 141—69)

This invention relates to improvements in a liquid whipping and dispensing machine, and more particularly to an improved beverage dispensing machine which will automatically aerate the beverage to a smooth creamy consistency during the dispensing thereof; this being accomplished, in the preferred embodiment of the invention illustrated herein, by violent whipping of the beverage in a chamber in the presence of air, the air entering through an air-bleed channel into the low pressure area of the chamber, while the beverage is flowing through the high pressure area of the chamber during each dispensing operation.

The primary object of the invention is the provision of an apparatus in which a beverage may be efficiently agitated at will, so as to whip the beverage into a creamy consistency with foam, while it is being dispensed into a container placed in operative relation thereto and removed therefrom to discharge its contents.

One object of the invention is the provision of an apparatus embodying a container in which a beverage is retained, a cylindrical shaped chamber attached to the container through which the beverage flows while being dispensed, a motor-driven agitator mounted within the chamber at a substantially fixed distance from the motor, an air-bleed channel leading into the low pressure area of the chamber adjacent the end portion of the agitator blades, and means adapted to be moved by a receptacle in cooperative relation as a result of manual manipulation or placement of the receptacle itself for controlling the motor and agitator connected therewith, the starting and stopping of the motor being responsive to the placement and removal of the receptacle.

Another object of the invention is to provide a beverage dispensing machine embodying a beverage container, a chamber connected with said container, a motor and a motor-driven agitator mounted in said chamber and adjacent a restricted beverage outlet, which motor is receptacle controlled, the placement and removal of the receptacle starting and stopping of the motor.

A further object of the invention is to provide means in a beverage dispensing machine for automatically, thoroughly, aerating the beverage in a chamber by an agitator adjacent its outlet, by violent agitation in the presence of air drawn into the low pressure area of the chamber through an air-bleed channel by the agitator, while the beverage is flowing through an outlet of the machine during each dispensing operation.

Other important objects and advantages of the invention, including an improved structure for accomplishing the above objectives, will be made further apparent and will appear from the following description in the specification and appended drawings.

Referring to the drawings, which illustrate the invention, and in which like characters indicate like parts throughout the several views:

Figure 1 is a view in side elevation with some parts broken away, of the liquid whipping and dispensing machine constructed in accordance with our invention; a receptacle shown by dotted lines;

Figure 2 is a view in front elevation of machine shown by Fig. 1;

Figure 3 is a fragmentary, enlarged view in side elevation of the machine shown by Figures 1 and 2, with some parts shown in section;

Figure 4 is a fragmentary front elevational view, on an enlarged scale, of the machine shown by Fig. 2, with some parts broken away, showing the air-bleed channel entering the low pressure area of the chamber and the restricted nozzle outlet leaving the high pressure area of the chamber;

Figure 5 is a sectional view of the beverage whipping chamber, taken substantially on line 5—5 of Fig. 4;

Figure 6 is a top plan view on an enlarged scale of the dispensing nozzle embodied in the machine and clearly shown by Figures 1, 2, 3 and 4;

Figure 7 is a view in side elevation with some parts broken away, of a modification of a beverage aerator and dispenser having a horizontal aeratoring chamber with an agitator mounted therein and upon the upper end of an electric motor-driven drive shaft;

Figure 8 is a fragmentary view in side elevation, on an enlarged scale, of the machine shown by Fig. 7, with some parts broken away, showing the agitator and associated parts;

Figure 9 is a fragmentary transverse horizontal sectional view taken substantially on line 9—9 of Fig. 8 looking in the direction of the arrows showing the air-bleed channel entering the low pressure area of the mixing chamber;

Figure 10 is a vertical axial sectional view, on an enlarged scale, of the dispensing nozzle embodied in the machine shown by Figures 7 and 8; and Figure 11 is a top plan view on an enlarged scale of the dispensing nozzle shown by Figures 7, 8 and 10 showing the difference to eliminate the whirling action of the liquid.

The invention is exemplified in a beverage dispensing machine, the general numeral 15 indicating the machine in its entirety. The dispenser 15 has a base supporting housing 16 suitably constructed to support a beverage container 17 with a horizontal outlet member 18 and valve body 19 integrally formed therewith. The body of the valve is preferably so constructed that a valve actuating control element 20 extends thereabove and the upper end may be pressed by the thumb, or the entire hand.

In detail the valve body 19 embodies a valve seat 21 in its lower wall 22, a downwardly extending hollow well 23 is formed in its upper wall, a hole 24 is centrally located in the bottom wall 25 of said well 23. A disc valve 26 fits over the valve seat 21. A valve stem 27 extends upwardly from the valve 26 through the hole 24 and into the interior of the hollow well 23. On the outer end of the valve stem 27 is threadedly secured a valve actuating control element, or thumb-head 20 which has a depending hollow portion so shaped as to slidably fit within the interior of the hollow well 23. A coil spring 28 in the recess of the thumb-head 20 and around the stem 27 bears at one end against the wall 22 and at the other end against the inner face of the control element or head 20 so as to normally urge the head 20 outwardly and away from the body 19 thereby to seat the valve 26. In order to unseat the valve 26 it is only necessary to press the head 20 toward the body 19 and against the action of the spring 28.

The lower male portion 30 of the body 19 is threaded externally at 31 so as to receive the removable aerating chamber 33. Said chamber 33 comprises a casing 31 of circular vertical cross section with tubular ends 34 to which is bolted a detachable cover plate 35, the latter having formed integral therewith a rectangular shaped boss 36. The rear wall 38 of said chamber 33 has formed integral therewith a horizontal tubular male extension 39 with a cylindrical bore forming a bearing 40. An agitator 42 is located axially within the casing 31 with its horizontal shaft 44 mounted in bearing 40, the blades 45 thereof spaced from the inner walls of the casing 31 and from the cover plate 35, whereby the agitator 42 may be removed from the casing by withdrawing its shaft 44 from bearing 40. The shaft 44 is recessed or split to receive the flat drive end portion 50 of shaft 51. Said end portion 50 acts as an interconnection and driving member between the flexible drive shaft 51 and the shaft 44 on agitator 42. Said flexible drive shaft 51 is connected to the motor drive shaft 52 at one end and to the horizontal rear end of shaft 44 at its upper end, said motor drive shaft 52 being suitably journalled within motor 55 rigidly supported within housing 16. An agitator control means is provided, including a case 56 containing a switch of usual construction and having its members connected to control the motor 55, said case being fixedly secured to the outside of the motor-casing 57 of the motor 55. A spring-pressed button 58 operates the switch in the case 56 to close the electrical circuit and cause the motor 55 to run while the bottom is pushed inwardly and to open said circuit to stop the motor when the button is released. A lever 59 for operating the switch button 58 to control the operation of the motor 55, is pivoted to the case 56 by a pin 60 whereby the upper portion 61 of said arm contacts said pin 58. Inward movement of the lower portion 62 toward the support housing 16, by contact of a receptacle 69 causes the lever to operate the switch-button 58 to start the motor; outward movement of the arm releases the switch-button 58 to stop the motor.

The casing 31 of chamber 33 is provided with an air-bleed channel 65 clearly shown by Figures 4 and 5. Figure 4 clearly shows a casing 31 and the quadrants therein. The air bleed channel 66 enters the air chamber in a tangential manner directing the air passing therethrough against the clyindrical interior wall surface in the low pressure portion of the chamber. The chamber can be considered to have four quadrants; by moving in a counter-clockwise direction, the quadrants are known as 1, 2, 3, and 4; quadrants 1 and 2 above the center line and 3 and 4 below the center line, quadrants 1 and 4 being on the right side of the vertical plane and considered the high pressure areas when the agitator is rotated in a clockwise direction and quadrants 2 and 3 being the suction, or low pressure quadrants. The channel 65 is constructed with its exterior end 66 terminating at the bottom of the casing and with its upper end 67 terminating tangentially at the inner wall surface and forming an opening or port at a point in a longitudinal plane extending thru the agitator 42 and its shaft 44. The agitator 42 rotates in a clockwise direction when viewed from the front of the machine, whipping the beverage within the chamber, drawing air through the air-bleed channel 65 into the low pressure side and area of the chamber effecting the beverage to become aerated and of a creamy consistency with foam in the high pressure side. Quadrants 2 and 3 are the low pressure areas, quadrants 1 and 4 being the high pressure areas. The beverage is allowed to flow outwardly through the dispensing nozzle 70 from quadrant 4, or the high pressure area, said nozzle having a circular inlet portion 71, an inverted conical bottom outlet portion 72 tapering inwardly to form an outlet 73 at the base thereof of reduced diameter from that of the inlet portion 71.

The conical bottom of the outlet portion 72 embodies vertical restricting plates 74 extending in a cross configuration, said plates 74 forming diffuser members to insure that the whirling action of the beverage is broken up, said plates increasing the efficiency of the nozzle 70 and giving easier discharge therefrom as the pressure loss due to the whirling action is greatly decreased.

The operation will be as follows: Assuming the machine to be idle, the container 17 filled with a suitable beverage or hot chocolate syrup, the operator will place the receptacle 69 against the arm portion 62 starting the motor 55. Downward movement by the operator of the thumb-head 20 from the position shown in Fig. 3 opens the valve 26 allowing the beverage to pass from the container, or reservoir 17, through the conduit 18 into chamber 33 where the beverage flow is intercepted by the rapidly rotating agitator 42 which thoroughly whips and agitates the beverage with air drawn through air-bleed channel 65 to a smooth and creamy consistency with foam. The foamy aerated beverage passes through the dispensing nozzle 70 where the whirling action is eliminated but the foam retained, and then into the receptacle 69 positioned beneath the same. When the receptacle 69 is nearly full, the operator will release his hand, or thumb from the thumb-head 20, the spring 28 then moves the valve 26 to its closed position. The operator then removes the receptacle 69 from against the lever 59 and the control button 58 moves outwardly therewith to its original starting position; and the movement of the button opens the control switch stopping the motor 55 and the agitator 42.

It is an important feature of this invention to provide the aerating chamber 33 intermediate the valve housing 19 and the restricted outlet 73 of the dispensing nozzle 70, with the separate valve operating means, and with the inoperative agitator 42 simultaneously actuated by the displacement of the receptacle 69 against the arm 59 to vigorously agitate and aerate the beverage as it is dispensed from the container 17. The agitator only aerates the beverage in the high pressure flowing downwardly from the container, or reservoir 17, to the receptacle 69. By intercepting and whipping the flow of beverage as it flows to the receptacle, and aerating it with air drawn in thru the air-bleed 65 and discharged tangentially against the cylindrical interior surface of said chamber, we are able to provide a more effective and thorough whipping and aerating of the beverage with plenty of desired foam and discharge it through a restricted nozzle, preventing splash, it being more effective than by any known previous dispensing machine. The whirling action of the beverage is broken up completely by the diffusers in the dispensing nozzle.

In the modification of the invention as shown by Figures 7 through 11, the machine 15 is equipped with a modified aerating chamber arranged horizontally, with a horizontal air-bleed therein, and the motor arranged beneath the same with a vertical drive shaft; the parts identical with parts described in Figure 1 through 6 have been marked with the same reference numerals.

As shown by Figures 7, 8 and 9 the beverage container, or reservoir 17, has the outlet member 18 with a modified valve body 19' and aerating chamber 33' formed integrally therewith. The valve body 19' embodies a conical valve 26' with stem 27, spring 28, and thumb head 20 associated therewith. Downward pressure upon the head 20 allows the beverage to flow to the aerating chamber 33' with cover plate 35 and boss 36. A downturned tubular elbow 30' is formed upon the far side of the aerating chamber, the lower end of said elbow having the dispensing nozzle 70 attached thereto in a suitable manner, said nozzle having the restricted portion 72, outlet 73 and diffusers 74. The motor 55' is mounted within the supporting housing 16 with its motor shaft 52' arranged vertically; a vertical drive shaft 51' attached to said motor shaft and embodying the flat end 50. Said end 50 fitting in recess of shaft 44 formed with blades 45 of the agitator 42. A lever 59' for operating the switch button 58 to control motor 55' is pivoted to a support 56' by a pin 60 whereby the cam portion 61' of said arm contacts said pin 58. Inward movement of the lower portion 62' by its contact with a receptacle 69 causes the lever to operate the switch-button 58 to start the motor, outward movement of the arm releasing the switch-button 58 to stop the motor 55'.

The casing 31' of chamber 33' is provided with a horizontal air-bleed channel 65' clearly shown by Fig. 9. The channel 65' has its exterior end 66 adjacent the elbow 30' and its cylindrical inner end 67 terminating tangentially at the inner wall surface directly opposite the agitator shaft and in a horizontal plane passing through the central portion of the valve body 19' and aerating chamber 33'. The agitator rotating in a clockwise direction draws air through the air-bleed channel into the low pressure side or area of the chamber 33' The beverage flows through the elbow and through the nozzle with diffusers therein as described above, no splashing of the beverage being encountered.

The operation of the modified machine is the same as described with regard to the preferred form of machine.

It will now be easily understood that there is provided a dispensing machine having detachable parts whereby parts may be substituted and easily removed for sanitary cleaning thereof. The beverage to be dispensed may be served in a chilled condition, or heated as when serving hot chocolate. The beverage is properly aerated in either condition by the machines disclosed in this specification according to our invention.

It will be obvious to those skilled in the art that our invention may be modified and variations may be effected without departing from the cope of the novel concepts of the present invention.

What we claim is:

1. In a beverage dispenser, a beverage container, a gravity flow conduit leading generally outwardly and downwardly from the container and having an open discharge end at a dispensing zone and in constant communication with the atmosphere, said conduit comprising an enlarged intermediate portion defining an air chamber having an inlet and an outlet, said chamber having a cylindric 1 interior surface and closed ends, a normally closed control valve associated with said conduit between the container and the air chamber controlling the flow of said beverage through said conduit and having a valve actuating control element, a normally inoperative motor-driven agitator located in said air chamber between the inlet and outlet thereof which intercepts the beverage flowing through said air chamber and mixes the same with air to a desired consistency embodying foam, a normally open air-bleed channel formed in the air-chamber wall communicating between the inside air chamber and the outside atmosphere through which the air is drawn by the agitator for aerating said beverage, said air-bleed channel forming a port in said cylindrical interior surface, and a control means for the motor-driven agitator comprising a switch operatively coupled to a movable arm, movement of said arm in a direction away from its normal position rendering the agitator operative and movement of said arm to its normal position rendering said agitator inoperative.

2. The structure defined by claim 1 in which said air-bleed channel extends vertically within the air-chamber wall and said port is a tangential opening in said cylindrical interior surface of said air-chamber, disposed relatively near the area of rotation of said agitator in the low pressure, or suction area, of the chamber whereby the exterior air will be caused to flow through the air-bleed channel to the air-chamber and be discharged tangentially against the cylindrical inter surface thereof, and the gravity flow conduit has a dispensing nozzle at its open discharge end, said nozzle having a restricted lower end portion.

3. The structure defined by claim 1 in which the gravity flow conduit has a dispensing nozzle attached to its open discharge end, said nozzle having diffuser blades mounted therein.

4. The structure defined by claim 1 in which the gravity flow conduit has a dispensing nozzle at its open discharge end, said nozzle having a restricted lower end portion with diffuser blades mounted therein and adjacent the lowermost end thereof.

5. The structure defined in claim 1 in which the intermediate portion of said conduit which defines the air chamber being generally cylindrical with its axis generally horizontally disposed, the conduit section above the air chamber discharging through the curved top portion thereof, said agitator comprising an impeller mounted in suitable bearings in one of the vertical walls of said cylindrical air chamber and arranged for rotation about the general horizontal axis of said air chamber, and said outlet at the bottom of said air chamber being disposed in vertical alignment with the inlet of said chamber.

6. The structure in claim 5 in which the gravity flow conduit has a dispensing nozzle attached to its open discharge end, said nozzle having a restricted lower end portion with diffuser blades arranged therein and adjacent the lowermost end thereof, whereby the whirling motion effected by the rotation of the agitator is substantially eliminated.

7. In a beverage dispenser, a beverage container, a gravity flow conduit leading generally outwardly and downwardly from the container and having an open discharge end at a dispensing zone in constant communication with atmosphere, said conduit comprisng a diametrically enlarged intermediate portion defining an air chamber having an inlet and an outlet, said outlet forming a dispensing nozzle with a restricted end portion and disposed at the bottom of said air chamber, a normally closed control valve associated with said conduit between the beverage container and the air chamber controlling the flow of passage through said conduit, a valve actuating control element associated with said valve, a motor-driven agitator located in said air chamber between the inlet and outlet thereof, a control means for said motor-driven agitator, an air-bleed channel formed in a wall of the air chamber communicating between the interior of said air chamber and the atmosphere outside said air chamber, said agitator arranged in a suitable bearing in the wall of said chamber for rotation within the chamber, said agitator intercepting air into said chamber through said air-bleed channel and mixing the same together to effect a beverage with an aerated consistency.

8. The structure in claim 7 in which a movable arm is pivotally mounted upon the dispenser and forming a part of the agitator control means, pivotal movement of said arm in a direction away from its normal position rendering effective operation of said agitator control means and rendering the agitator operative and movement of said arm to its normal position rendering said agitator inoperative.

9. A liquid whipping machine comprising a base, a liquid container mounted upon said base, a liquid whipping chamber, a liquid conduit arranged between said container and said chamber, a normally closed control valve associated with said conduit between said container and said chamber, a motor-driven agitator mounted in a suitable bearing for rotation within said chamber, said chamber having cylindrical interior wall surface and a removable cover, an air-bleed channel formed with said chamber communicating between an opening in the interior wall surface thereof and the atmosphere, said motor-driven agitator embodying a drive shaft, said shaft located in said chamber between the inlet and outlet thereof, a dispensing nozzle connected to the outlet of said chamber, said nozzle having a restricted outlet, an electric motor supported upon the base of said machine, a flexible cable arranged and connected between the motor drive shaft and the agitator drive shaft, a control element associated with an electric circuit connected with said motor, pivoted means operable to effect movement of said control element, said nozzle supported with sufficient clearance to permit a receptacle with an open top to be placed below the same, said pivoted means arranged to be manually shifted by a receptacle when placed below said nozzle, whereby the shifting of the pivoted means effects movement of said control element, starting of said motor, rendering said agitator operative, and whereby removal of said receptacle will render said motor and agitator inoperative, said agitator intercepting the beverage flowing through said chamber, drawing air tangentially into said chamber through said air-bleed channel and dispensing the air against the cylindrical interior wall surface and whipping the beverage and air together to effect a beverage with aerated consistency.

10. The structure defined in claim 1 in which the intermediate portion of said conduit which defines the air chamber is generally cylindrical with its axis generally vertically disposed, said chamber having an inlet and outlet arranged at opposite sides thereof in a horizontal plane, said outlet having a curved tubular elbow in communication therewith and disposed offset from the generally vertical axis of said air chamber, and said agitator comprising an impeller concentrically arranged within the cylindrical air chamber intermediate said inlet and said outlet of said chamber and mounted for rotation about the general vertical axis of said chamber.

11. The structure defined in claim 10 in which said air-bleed channel extends horizontally within the air-chamber wall and said port is a tangential opening in said cylindrical interior surface of said air-chamber, disposed relatively near the area of rotation of said agitator in the suction area of the chamber whereby the exterior air will be caused to flow through the channel to the chamber and be discharged tangentially against the cylindrical interior surface thereof, and the motor for actuating said agitation is horizontally mounted below said agitator with its drive shaft in vertical alignment with the drive shaft of said agitator and suitably connected therewith.

12. The structure defined in claim 11 in which the movable arm is pivotally mounted upon the dispenser housing and forming a part of the agitator control means, said chamber outlet embodying a dispensing nozzle with a restricted outlet, said nozzle arranged with sufficient clearance to permit a receptacle with an open top to be placed below the same, said movable arm arranged to be manually shifted by a receptacle when placed below said nozzle, the shifting of the arm effecting the starting and stopping of the motor and said motor-driven agitator.

13. The structure defined in claim 10 in which the chamber outlet embodies a dispensing nozzle with a restricted outlet embodying diffusers whereby the liquid whirl is eliminated.

References Cited in the file of this patent

UNITED STATES PATENTS

| 2,620,108 | Copping | Dec. 2, 1952 |
| 2,775,877 | Bruntjen | Jan. 1, 1957 |
| 2,777,675 | Stelzer et al. | Jan. 15, 1957 |
| 2,855,007 | Erickson et al. | Oct. 7, 1958 |